May 26, 1959 G. E. HANSELL 2,888,554

DIVERSITY RECEPTION

Filed Sept. 6, 1955 3 Sheets-Sheet 1

INVENTOR.
Grant E. Hansell
BY
H. A. Rechif
ATTORNEY

INVENTOR.
Grant E. Hansell
BY
[signature]
ATTORNEY

INVENTOR.
Grant E. Hansell
BY
G. A. Rechif
ATTORNEY

United States Patent Office 2,888,554
Patented May 26, 1959

2,888,554
DIVERSITY RECEPTION

Grant E. Hansell, Riverhead, N.Y., assignor to Radio Corporation of America, a corporation of Delaware Application September 6, 1955, Serial No. 532,650
6 Claims. (Cl. 250—8)

This invention relates to diversity reception, and more particularly to the diversity reception of frequency shifted tone telegraph signals transmitted by a single sideband (SSB) transmitter.

The diversity reception of tone telegraph signals using single sideband transmission presents a problem in obtaining good diversity action at the receiver. The consensus of opinion on the subject at the present time is that any diversity system to be effective must be fast enough in action to take advantage of frequency diversity; in other words, it must be capable of accepting mark signal from one of the dual diversity receivers and space signal from the other, if this is the best signal condition at the moment. However, if diversity action is obtained by gating, rectification of the signal voltage is necessary to obtain the gating intelligence. The time constants on the rectifiers used must be short enough to enable frequency diversity action as aforementioned, and yet long enough to filter off the rectified signal frequency (ripple frequency). These limitations on the time constants have been found to be almost impossible to meet, at the low audio frequencies employed in most SSB frequency shifted tone telegraph systems.

An object of this invention is to devise a diversity reception system which is fast enough in action to take advantage of frequency diversity, and in which rectification to obtain gating intelligence is not required.

In frequency shift keyed tone telegraph systems employing high keying speeds, on the order of 250 or 300 words per minute, it is necessary, for proper reception, for the low pass filter following the discriminator-detector to pass keying frequencies up to about 300 cycles per second (c.p.s.). At the same time, this filter must reject the signal frequency itself (the ripple frequency). It is very difficult to build such a filter to reject the low audio frequencies (e.g., 425 c.p.s.) employed in most SSB frequency shift keyed tone telegraph systems, while passing 300 c.p.s.

Another object of this invention is to provide a diversity reception system in which the filter coupled to the detector output can easily remove the signal frequency (ripple frequency) and still pass the maximum desired keying frequency.

A further object is to devise a diversity reception system which reduces considerably the number of tubes and the complexity of the circuitry as compared to existing systems, while yet obtaining good diversity action.

The objects of this invention are accomplished, briefly, in the following manner: at the receiver, the intermediate frequency (IF) signals out of two diversity receivers are demodulated with oscillators of two different frequencies to provide a frequency difference between the two diversified signals carrying the same intelligence. More particularly, the two IF signals are demodulated or heterodyned down to the audio range, but to two audio frequencies different from each other and several orders of magnitude greater than the tones as originally transmitted, that is, "offset" from such transmitted tones. The frequency difference beween the two diversified signals makes it possible to use a common limiter for diversity action, the limiting system being fast enough in action to take advantage of frequency diversity.

A more detailed description of the invention follows, with reference to the accompanying drawings, wherein.

Figure 1:
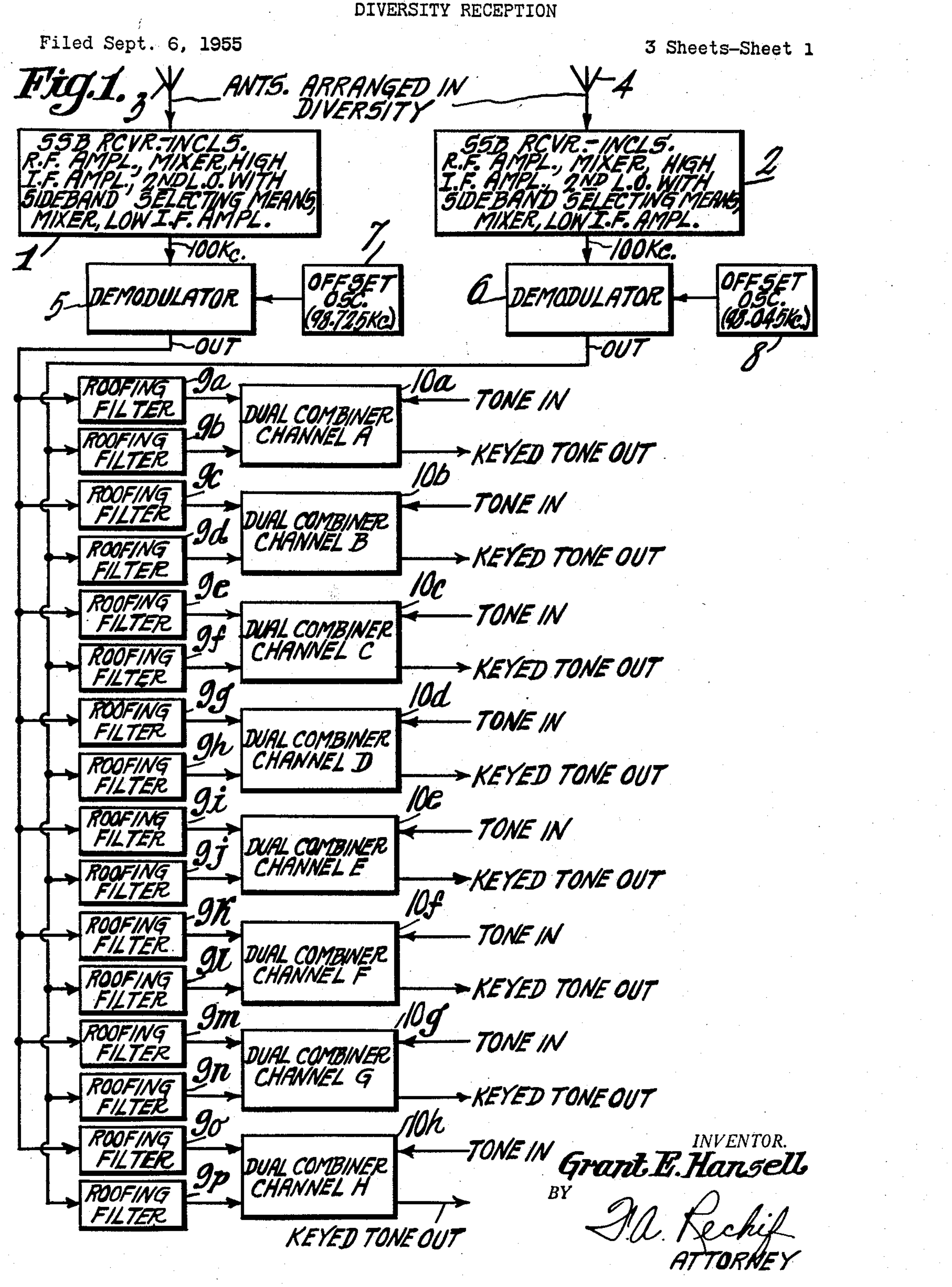
Fig. 1 is a block diagram of a diversity receiving system according to this invention.

First referring to Fig. 1, two SSB superheterodyne receivers 1 and 2 are arranged for diversified reception of multiplex frequency shift keyed tone telegraph signals transmitted from a remote transmitter, this diversified reception being obtained by means of separate respective pickup antennas 3 and 4 arranged in either space or polarization diversity with respect to the remote transmitter. Alternatively, instead of the two separate receivers 1 and 2 illustrated, a so-called "dual diversity SSB receiver" may be utilized, but the principle is the same, diversified receiving antennas feeding into separate signal channels. The receivers 1 and 2 are adapted to receive frequency shift keyed telegraph signals in the range of 2.8 to 28 mc., for example. Each SSB receiver is more or less conventional and each includes one or more radio frequency amplifier stages, followed by a mixer fed with energy from a first local or beating oscillator, and one or more high IF amplifier stages. These are in turn followed by a further mixer stage fed by a second local oscillator or beating oscillator, and also by a low IF amplifier stage, to give an IF output having a center frequency of 100 kc. and shifted in frequency in accordance with the mark-space telegraph keying. The IF outputs of receivers 1 and 2 are fed to respective demodulators 5 and 6.

At the transmitter, either upper sideband or lower sideband transmission can be used. In each receiver 1 and 2, the second local oscillator or beating oscillator is provided with sideband selecting means, which comprises a switching arrangement whereby the oscillator may be operated at either one of two frequencies, for example 900 or 1100 kc. A choice of 900 or 1100 kc. for the second beating oscillator produces the sideband above the carrier at the input to the respective demodulators 5 and 6, that is, either upper or lower sideband transmission can be made the upper sideband at the demodulator inputs. In this way, the sideband containing the desired intelligence is selected in each of the two receivers 1 and 2 and passed on to the respective demodulators 5 and 6. At the outputs of receivers 1 and 2, the operation is such that the pseudo-carrier (actually, the center frequency) is at 100 kc. and, since the upper sideband is made to appear at the demodulator inputs, the multiplex tone channels are above the "carrier" by the same amount as transmitted.

If the signals were demodulated in demodulators 5 and 6 with a 100 kc. local carrier, the original transmitted tone frequencies would result. However, according to this invention the telegraph sidebands are demodulated using "offset" oscillators such that the tone channels are reproduced (at the demodulator outputs) at a higher audio frequency than was transmitted, and also the two diversified signals are "offset" by different amounts from the tone frequencies at the remotely located transmitter. By using frequencies different from 100 kc. to demodulate the signals in demodulators 5 and 6, the tone frequencies can be "offset" any amount desired. The "offset" allows better filtering of the detected tones and also permits the diversity selection to be accomplished in a common limiter, if the "offsets" in the two diversity receivers are different from each other. In practice, the diversified signals are offset so that in the common limiter for each multiplex channel the frequencies differ by twice the frequency separation of adjacent multiplex channels.

For example, an eight-channel multiplex system is disclosed in Fig. 1, such a system as might be used for a diplex speed of 85⁵⁄₇ bits per second. This system could have a frequency shift in each channel of 170 c.p.s. (between mark and space), and a separation between adjacent multiplex channels of 340 c.p.s. In this case, receiver 1 could have an offset of 1275 c.p.s., so that the frequency of its offset oscillator 7 feeding into demodulator 5 for signal demodulation purposes would be 100 kc. minus 1275 cycles, or 98.725 kc. Receiver 2 could have an offset of 1955 c.p.s., so that the frequency of its offset oscillator 8 feeding into demodulator 6 for signal demodulation purposes would be 100 kc. minus 1955 cycles, or 98.045 kc. If the two diversified signals for each channel are fed into a common limiter, the frequencies fed to such limiter would differ by 1955 cycles minus 1275 cycles, or 680 cycles, twice the separation between adjacent channels.

The following is a table of the transmitted audio frequencies for an eight-channel multiplex system as just discussed, together with the audio frequencies appearing at the outputs of demodulators 5 and 6.

*Table I*

| Channel | Transmitted Frequency | | Demod. 5 out (offset 1,275) | | Demod. 6 out (offset 1,955) | |
|---|---|---|---|---|---|---|
| | Space | Mark | Space | Mark | Space | Mark |
| A | 425 | 595 | 1,700 | 1,870 | 2,380 | 2,550 |
| B | 765 | 935 | 2,040 | 2,210 | 2,720 | 2,890 |
| C | 1,105 | 1,275 | 2,380 | 2,550 | 3,060 | 3,230 |
| D | 1,445 | 1,615 | 2,720 | 2,890 | 3,400 | 3,570 |
| E | 1,785 | 1,955 | 3,060 | 3,230 | 3,740 | 3,910 |
| F | 2,125 | 2,295 | 3,400 | 3,570 | 4,080 | 4,250 |
| G | 2,465 | 2,635 | 3,740 | 3,910 | 4,420 | 4,590 |
| H | 2,805 | 2,975 | 4,080 | 4,250 | 4,760 | 4,930 |

In the above table, the numerical values are all in cycles per second (c.p.s.). It will be noted that mark is the higher frequency. This is in accordance with the latest proposed standard, which is that mark should be the higher frequency at the transmitter. Hence, the listing would be correct for upper sideband transmission and reversed for lower sideband transmission. It should also be pointed out that it is necessary to reverse the keying at the transmitter when changing from upper sideband to lower sideband transmission, if the said proposed standard is used.

From the above table, it may be noted that the frequency separation between the two mark frequencies for each channel, and between the two space frequencies for each channel (which mark and space frequencies are the frequencies present in each of the common limiters previously referred to), is 680 c.p.s., twice the channel separation of 340 c.p.s.

By way of another example, a three-channel system could be used for four-channel time division multiplex speed, 171³⁄₇ bits per second. This system could have a frequency shift in each channel of 340 c.p.s. (between mark and space), and a separation between adjacent multiplex channels of 680 c.p.s. In this case, receiver 1 could have an offset of 1190 c.p.s., and receiver 2 an offset of 2550 c.p.s. Table II, which follows, is a table of the transmitted audio frequencies for a three-channel system, together with the audio frequencies appearing at the outputs of demodulators 5 and 6 for this case.

*Table II*

| Channel | Transmitted Frequency | | Demod. 5 out (offset 1,190) | | Demod. 6 out (offset 2,550) | |
|---|---|---|---|---|---|---|
| | Space | Mark | Space | Mark | Space | Mark |
| A | 765 | 1,105 | 1,955 | 2,295 | 3,315 | 3,655 |
| B | 1,445 | 1,785 | 2,635 | 2,975 | 3,995 | 4,335 |
| C | 2,125 | 2,465 | 3,315 | 3,655 | 4,675 | 5,015 |

Again, the numerical values are all in c.p.s. From Table II, it may be noted that the frequency separation between the two mark frequencies for each channel, and between the two space frequencies for each channel (which mark and space frequencies are the frequencies present in each of the common limiters previously referred to, for the case of Table II), is 1360 c.p.s., twice the channel separation of 680 c.p.s.

The signals from the demodulators 5 and 6 are separated into channels by sixteen channel roofing filters 9*a* through 9*p*, two roofing filters for each channel A through H of Table I, one filter for the output of demodulator 5 and one for the output of demodulator 6. Thus, the output of demodulator 5 is supplied in parallel to the inputs of roofing filters 9*a*, 9*c*, 9*e*, 9*g*, 9*i*, 9*k*, 9*m* and 9*o*, while the output of demodulator 6 is supplied in parallel to the inputs of roofing filters 9*b*, 9*d*, 9*f*, 9*h*, 9*j*, 9*l*, 9*n* and 9*p*. Each roofing filter selects and passes the desired mark and space frequencies for a particular channel. Thus, referring to Table I, roofing filter 9*a* would select out and pass, from the composite output of demodulator 5, its mark and space frequencies for channel A, 1700 and 1870 c.p.s., and roofing filter 9*b* would select out and pass, from the composite output of demodulator 6, its mark and space frequencies for channel A, 2380 and 2550 c.p.s. Roofing filter 9*c* selects and passes, from the output of demodulator 5, the mark and space frequencies appropriate to channel B, roofing filter 9*d* selects and passes, from the output of demodulator 6, the mark and space frequencies appropriate to channel B, and so on.

Figure 2:
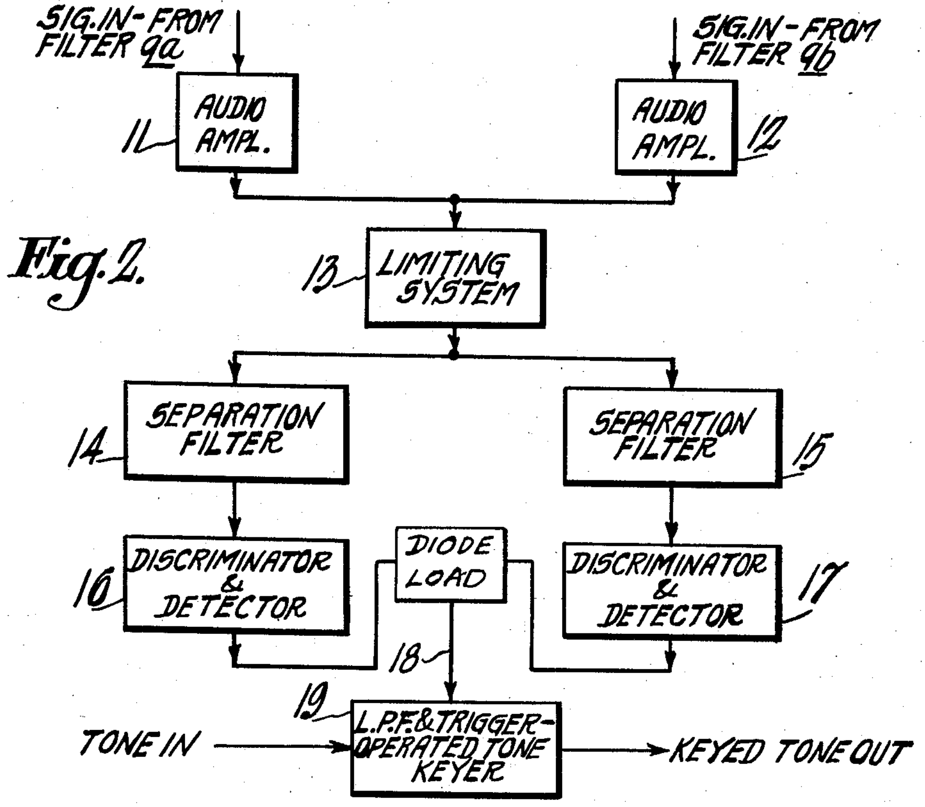
Fig. 2 is a block diagram of one of the dual diversity combiners of Fig. 1.

The outputs of each pair of roofing filters are connected to the input of a separate dual combiner, one of which is shown in more detailed block diagram form in Fig. 2. A separate dual combiner or channel combiner is required for each channel to be received, such as channels A through H, the eight combiners being denoted by reference numerals 10*a* through 10*h*. The outputs of filters 9*a* and 9*b* are applied to combiner 10*a*, the outputs of filters 9*c* and 9*d* are applied to combiner 10*b*, and so on. Thus, each of the combiners such as 10*a* has one of its inputs coming from receiver 1 (through demodulator 5 and say roofing filter 9*a*) and the other from receiver 2 (through demodulator 6 and say roofing filter 9*b*). Each of the combiners 10*a* through 10*h* operates to in effect select the stronger of the two diversified audio frequency or tone signals fed thereto, to convert the selected signal to a keyed D.C. voltage, and to utilize this keyed voltage in a tone keyer (which is fed with an audio tone) to produce an on-off keyed tone output. The connections for feeding tone into each dual combiner, and for taking keyed tone output therefrom, are indicated in Fig. 1.

One of the dual combiners, say 10*a*, is illustrated in more detailed block diagram form in Fig. 2. All of the combiners 10*a*–10*h* are of the same type. The audio frequency signal passed by roofing filter 9*a* is amplified in an audio amplifier 11, while the audio frequency signal passed by roofing filter 9*b* is amplified in an audio amplifier 12. Amplifiers 11 and 12 are separate but the outputs of these amplifiers are combined and applied to a common limiting system 13.

Referring back to Table I, the audio frequency signal output of amplifier II may have space and mark frequencies of 1700 and 1870 c.p.s., respectively, while the audio frequency signal output of amplifier 12 may have space and mark frequencies of 2380 and 2550 c.p.s., respectively. Thus, at one instant the two space frequencies of 1700 and 2380 c.p.s. might be applied to limiting system 13, while at some other instant the two mark frequencies of 1870 and 2550 c.p.s. might be applied to limiting system 13. Thus, at every instant two different frequencies are applied to limiting system 13, and one of these frequencies may be of greater amplitude than the other, due to fading effects and the diversified arrangement of receivers 1 and 2.

A part, if not the main part, of the diversity switching action is brought about by the "capture effect" in the common limiting system 13. This "capture effect" is a common term as applied to frequency modulation reception and implies that, if two signals of different amplitudes and of sufficiently different frequencies are applied to a common limiter, at the limiter output the stronger input signal has a greater advantage over the weaker than it did at the limiter input, that is, it has "captured" the limiter. A few measured values will illustrate the point. If two signals of different frequencies are exactly equal at the limiter input, they will produce equal outputs. If the second signal has an amplitude of 70% of the first signal at the limiter input, it will be reduced to 35% of the first signal's amplitude at the limiter output. If the second signal has an amplitude of 50% of the first signal at the limiter input, it will be reduced to about 25% of the first signal's amplitude at the limiter output. This gives good diversity action.

There is no difficulty in making the limiting system 13 act fast enough to take advantage of frequency diversity, so as to select say mark signal from receiver 1 and space signal from receiver 2, or vice versa.

The output of limiting system 13 is applied in parallel to the inputs of two separation filters 14 and 15, which separate the frequencies for each receiver. For example, filter 14 would separate out and pass the 1700 and 1870 c.p.s. frequencies derived from receiver 1, while filter 15 would separate out and pass the 2380 and 2550 c.p.s. frequencies derived from receiver 2.

The output of filter 14 is applied to a discriminator and detector 16 designed to operate at the frequencies passed by filter 14, while the output of filter 15 is applied to a discriminator and detector 17 designed to operate at the frequencies passed by filter 15. Each of the discriminator-detector units 16 and 17 operates to convert the audio frequency signal input thereto to a keyed D.C. voltage output, and these outputs are combined in a common diode load, the output of which appears in the connection or junction point shown, schematically, at 18. The common diode load resistance for the diode detectors of units 16 and 17 produces an inherent switching action, to be hereinafter explained more in detail, which completes the diversity switching action. Therefore, it may be said that the diversity switching action is accomplished in this invention by a combination of the capture effect in the common limiting system 13 and the inherent switching action in the detector diodes due to their common load resistance.

The (selected) keyed D.C. signal voltage appearing across the common diode lead passes through a low pass keying filter in unit 19 and is then impressed on a trigger-operated tone keyer to operate the same to produce on-off keyed tone in accordance with the frequency shift keying transmitted from the remote transmitter. Tone frequency is supplied to the tone keyer in unit 19, and keyed tone output is taken therefrom. The trigger-operated tone keyer itself is more or less conventional.

According to this invention, the raising of the transmitted audio frequency by offset oscillator 7 (the lowest frequency transmitted, 425 c.p.s., being raised to 1700 c.p.s.) makes the filtering easier. This can best be explained with an illustration. In a certain type of multiplex system, the highest keying speed is about 250 or 300 words per minute. In order to pass sufficient keying components, the low pass filter in unit 19 must pass keying frequencies up to about 300 c.p.s., while removing the ripple frequency (the audio frequency applied to the input of the discriminator-detector). To build a filter that would pass 300 cycles and do a good job of rejecting the ripple frequency of 425 cycles (the lowest audio frequency applied to the discriminator-detectors, if offsetting were not employed according to this invention) is somewhat difficult. However, according to this invention the lowest ripple frequency is 1700 c.p.s. (see Table I), because of the offset oscillator 7, and 425 c.p.s is the lowest frequency transmitted. The job of the low pass filter in unit 19, which must in this invention pass up to 300 cycles and reject 1700 cycles, is now much easier. In other words, the filtering on the detector output can now easily remove the ripple frequency and still pass the maximum desired keying frequency.

Figure 3:
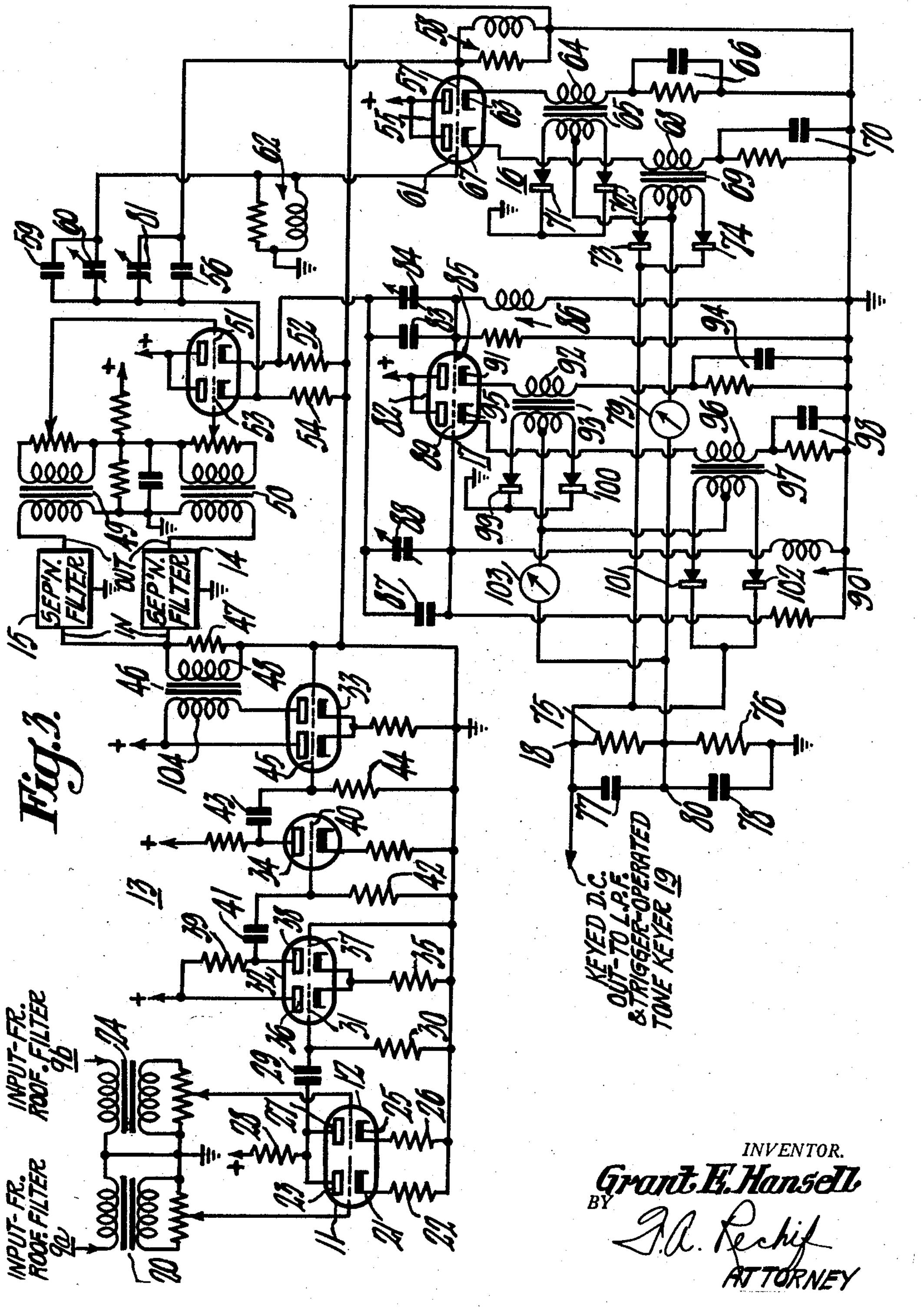
Fig. 3 is a circuit diagram of a dual diversity combiner according to this invention.

Now referring to Fig. 3, which is a circuit diagram of the dual combiner the block diagram of which is shown in Fig. 2, say combiner **10*a*, the output of roofing filter 9*a* is applied to one end of the primary winding of an input transformer 20, the other end of this winding being grounded. The secondary winding of transformer 20 has a potentiometer connected across it, the movable arm on this potentiometer being connected to the input electrode of an electrode structure 11 connected as an audio amplifier. Structure 11 includes a cathode 21 which is connected to ground through a resistor 22, and also includes an anode 23. The output of roofing filter 9*b* is applied to one end of the primary winding of an input transformer 24, the other end of this winding being grounded. The secondary winding of transformer 24 has a potentiometer connected across it, the movable arm on this potentiometer being connected to the input electrode of an electrode structure 12 connected as an audio amplifier. Structure 12 includes a cathode 25 which is connected to ground through a resistor 26, and also includes an anode 27. Structures 11 and 12** may be in the same envelope, these structures being constituted for example by a twin-triode type 12AX7 vacuum tube.

Structure 11 amplifies the audio signal derived from receiver 1 by way of demodulator 5, while structure 12 amplifies the audio signal derived from receiver 2 by way of demodulator 6. Anodes 23 and 27 are connected together and through a common anode load resistor 28 to the positive terminal of the unidirectional anode potential source. Thus, the amplified outputs of the two structures 11 and 12 are combined by the common load resistor 28 and the combined signal is applied by way of a coupling capacitor 29 and a grid leak resistor 30 to the input grid 31 of the limiting system 13. Limiting system 13 comprises two twin-triode tubes 32 and 33, each of which is connected as a separate cathode-coupled full-wave limiter, separated by a triode structure 34 connected as an amplifier. The two cathodes of tube 32 are connected together and to ground through a common coupling resistor 35. The anode 36 of the lefthand structure of tube 32 (which may be a twin-triode type 12AX7 vacuum tube, for example) is directly connected to the positive terminal of the unidirectional anode potential source. The grid 37 of the right-hand structure of tube 32 is connected directly to ground while the anode 38 of the right-hand structure of tube 32 is connected through a resistor 39 to the positive terminal of the anode potential source. Due to the cathode coupling by way of resistor 35, a positive change on the grid 31 effects a resultant negative change on the grid 37. This phase reversal causes the right-hand structure of tube 32 to effect the negative grid limiting for the positive half-cycles of the input wave while the left-hand structure of tube 32 effects it for the negative half-cycles. Thus, when grid 31 is swung negative, negative grid cutoff limits the change in cathode current caused by the input wave; when the grid 31 is swung positive, grid 37 is effectively swung negative until negative cutoff is reached for the right-hand structure of tube 32. The full-wave limiters 32 and 33 are both of the type illustrated in Crosby Patent No. 2,276,565, dated March 17, 1942.

Anode 38 is coupled to the control grid 40 of triode amplifier tube 34 through capacitor 41, over leak resistor 42. Tube 34, which may be a type 6C4 vacuum tube, is an amplifier which brings up the signal level to drive the second full-wave limiter 33 near its optimum operating point.

The amplified signal at the anode of tube 34 is applied by way of a coupling capacitor 43 and a grid leak resistor 44 to the grid 45 of tube 33. Tube 33 may be a twin-triode type 12AX7 vacuum tube and is connected similarly to tube 32 to operate as a cathode-coupled full-wave limiter, except that the anode load for the right-hand structure of tube 33 comprises the primary winding 104 of a transformer 46. Two cascaded limiters 32 and 33 are used to provide a greater operating input level range. For instance, the input as measured at the grids of structures 11 or 12 can be reduced more than 50 db below the normal operating level before the output will drop by 10% as measured across resistor 47 (which is connected across the secondary winding 48 of transformer 46 and one end of which is grounded) or at any point following that down to the output of the low pass filter following the discriminator-detectors (which output is keyed D.C.). This provides for a greater signal fading range without requiring a common automatic gain control system for the two signal versions of each multiplex channel. Eight such systems would ordinarily be required for an eight-channel multiplex system, because of selective fading, since one multiplex channel can fade while the others are not affected.

It will be recalled that the two signal versions for each channel combiner are of different audio frequencies. For example, for the channel A combiner 10*a* these might be, for one signal version, 1700 c.p.s. for space and 1870 c.p.s. for mark, and for the other signal version, 2380 c.p.s. for space and 2550 c.p.s. for mark. The common limiting system 13, through which both signal versions (from the diversity receivers 1 and 2) pass, functions by means of the "capture effect" to bring about a part of the diversity switching action, as previously described.

The separation filters 14 and 15, whose inputs are connected to the ungrounded end of secondary winding 48, separate the two signal versions, each from the other. The output of filter 15 is applied to the primary winding of a transformer 49, while the output of filter 14 is applied to the primary winding of a transformer 50. The signal in the secondary winding of transformer 49 is applied by way of a potentiometer to the grid 51 of a triode electrode structure connected as a cathode follower and having a cathode resistor 52 connected from its cathode to ground. Likewise, the signal in the secondary winding of transformer 50 is applied by way of a potentiometer to the grid 53 of a triode electrode structure connected as a cathode follower and having a cathode resistor 54 connected from its cathode to ground. The two structures of which grids 51 and 53 respectively form parts, may be located in a common envelope as shown, a type 12AU7 vacuum tube being used for this purpose.

The signal across cathode resistor 54 is applied to the input of a discriminator and detector 16, which may include a twin-triode type 12AU7 vacuum tube 55 connected as two cathode followers. A pair of parallel-connected capacitors 31 and 56 are located intermediate the cathode end of resistor 54 and the right-hand grid 57 of structure 55, while a parallel resistance-inductance combination 58 is connected from grid 57 to ground to provide frequency discriminatory characteristics. A pair of parallel-connected capacitors 59 and 60 are located intermediate the cathode end of resistor 54 and the left-hand grid 61 of structure 55, while a parallel resistance-inductance combination 62 is connected from grid 61 to ground to provide frequency discriminatory characteristics. Between the right-hand cathode 63 of structure 55 and ground, there are connected in series the primary winding 64 of a transformer 65 and a self-biasing resistance-capacitance network 66. Between the left-hand cathode 67 of structure 55 and ground, there are connected in series the primary winding 68 of a transformer 69 and a self-biasing resistance-capacitance network 70.

Four diodes 71, 72, 73 and 74 comprise the detector portion of discriminator and detector 16. Two of these (71 and 72) are connected one from each end of the secondary winding of transformer 65 to ground, while the other two (73 and 74) are connected one from each end of the secondary winding of transformer 69 to the common connection 18, shown as a junction point, for the common diode load. The latter consists of two resistors 75 and 76 connected in series from point 18 to ground, a capacitor 77 connected across resistor 75 and a capacitor 78 connected across resistor 76. The midpoints of the secondary windings of transformers 65 and 69 are connected together and through a meter 79 to the common junction 80 of resistors 75 and 76, so that meter 79 is in one feed to the diode load. The rectifiers 71–74 are arranged in what may be termed full-wave fashion, for full-wave rectification.

The signal across cathode resistor 52 is applied to the input of a discriminator and detector 17, which may include a twin-triode type 12AU7 vacuum tube 82 connected as two cathode followers. A pair of parallel-connected capacitors 83 and 84 are located intermediate the cathode end of resistor 52 and the right-hand grid 85 of structure 82, while a parallel capacitance-inductance combination 86 is connected from grid 85 to ground to provide frequency discriminatory characteristics. A pair of parallel-connected capacitors 87 and 88 are located intermediate the cathode end of resistor 52 and the left-hand grid 89 of structure 82, while a parallel resistance-inductance combination 90 is connected from grid 89 to ground to provide frequency discriminatory characteristics. Between the right-hand cathode 91 of structure 82 and ground, there are connected in series the primary winding 92 of a transformer 93 and a self-biasing resistance-capacitance network 94. Between the left-hand cathode 95 of structure 82 and ground, there are connected in series the primary winding 96 of a transformer 97 and a self-biasing resistance-capacitance network 98.

Four diodes 99, 100, 101 and 102 comprise the detector portion of discriminator and detector 17. Two of these (99 and 100) are connected one from each end of the secondary winding of transformer 93 to ground, while the other two (101 and 102) are connected one from each end of the secondary winding of transformer 97 to point 18. The midpoints of the secondary windings of transformers 93 and 97 are connected together and through a meter 103 to junction point 80, so that meter 103 is in the other feed to the diode load. The rectifiers 99–102 are arranged in what may be termed full-wave fashion, for full-wave rectification.

The discriminator-detector outputs are combined in the common diode load 75–78, and from point 18 the D.C. or keying output is taken off for passage through the low pass filter and thence to the trigger-operated tone keyer, in unit 19. The output of the tone keyer is on-off keyed tone.

Figure 4:
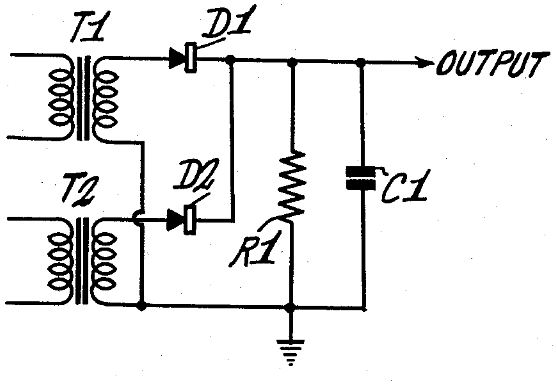
Fig. 4 is a simplified schematic diagram useful in explaining a portion of Fig. 3.

The diversity switching action in the common diode load 75–78 is a little difficult to explain because the rectifiers are full-wave and there are two diode loads actually involved. A simpler circuit, given in Fig. 4, can be used to illustrate the principle. In Fig. 4, two signals at an audio frequency are fed in by way of transformers T1 and T2. If the signal in the secondary of T1 has a peak value of 10 volts relative to ground and that in the secondary of T2 a peak value of 9 volts relative to ground, it can be seen that the capacitor C1 will hold the voltage at 10 volts D.C. if the time constant of R1, C1 is sufficient to hold over between cycles. This means that the upper end of resistor R1 is at +10 volts if its lower end is grounded. Since the A.C. voltage from transformer T2 feeding diode D2 is only 9 volts peak, the diode D2 cannot conduct, as it lacks one volt of reaching a value high enough to cause conduction. This means that the weaker signal at this point does not contribute to the receiver output, which would be taken from the upper end of R1 and C1. Thus, diversity switching, initiated by the common limiter such as 13, is completed by the action in the common diode load.

In an actual measurement with this circuit, it has been found that if the weaker signal is down by 12% as compared to the stronger signal, it does not contribute to the output. This is affected by the time constant of R1, C1 and how good it holds over between cycles of the audio frequency. The hold over is much better at 1700 c.p.s. than it would be at 425 c.p.s., as there are four times as many cycles or one-quarter the time element required to make the rectifiers hold up to the peak value. This is another reason for making the lowest audio frequency in the receiver 1700 c.p.s. in this invention, instead of the 425 c.p.s. transmitted.

In the actual circuit of Fig. 3, transformer 97, diode 101 and diode 102 act as a full-wave rectifier across the load 75, 77, with transformer 69, diode 73 and diode 74 across the same load. Transformer 93, diode 99 and diode 100 have resistor 76 and capacitor 78 for a load, with transformer 65, diode 71 and diode 72 across the same load. The load connections are so arranged that the direction of current is reversed in the latter case (for load 76, 78). The two diode loads 75, 77 and 76, 78 are then "stacked," with one end at ground potential and the other end the D.C. keying output. This stacking, with the diode currents in opposite directions, is what provides the typical slope curve (horizontal S) of the composite discriminator, there really being two discriminators 16, 17 involved, one for each receiver.

The channel combiner illustrated in Fig. 3 is much simpler in circuitry than are other known systems for performing the same function. The complete channel combiner contains only twelve tubes (five tubes in the trigger-operated tone keyer, in addition to the seven tubes in Fig. 3), while most other known systems require 25 to 30 tubes to perform the same function.

By way of example, the following values are given for certain of the circuit components in Fig. 3. These are the values used in a circuit built according to this invention and successfully tested.

| | |
|---|---|
| Diode **71** | 1N38A. |
| Diode **72** | 1N38A. |
| Diode **73** | 1N38A. |
| Diode **74** | 1N38A. |
| Diode **99** | 1N38A. |
| Diode **100** | 1N38A. |
| Diode **101** | 1N38A. |
| Diode **102** | 1N38A. |
| Transformer **20** | 600 ohms to 100K. |
| Transformer **24** | 600 ohms to 100K. |
| Transformer **46** | 100K to 600 ohms. |
| Transformer **49** | 600 ohms to 100K. |
| Transformer **50** | 600 ohms to 100K. |
| Transformer **65** | 15K to 15K. |
| Transformer **69** | 15K to 15K. |
| Transformer **93** | 15K to 15K. |
| Transformer **97** | 15K to 15K. |
| Resistor **22** | 2200 ohms. |
| Resistor **26** | 2200 ohms. |
| Resistor **28** | 120,000 ohms. |
| Resistor **30** | 1 megohm. |
| Resistor **35** | 6800 ohms. |
| Resistor **39** | 27,000 ohms. |
| Resistor **42** | 1 megohm. |
| Resistor **44** | 1 megohm. |
| Resistor **47** | 680 ohms. |
| Resistor **52** | 10,000 ohms. |
| Resistor **54** | 10,000 ohms. |
| Resistor **75** | 4700 ohms. |
| Resistor **76** | 4700 ohms. |
| Capacitor **29** | 390 mmfd. |
| Capacitor **41** | 390 mmfd. |
| Capacitor **43** | 390 mmfd. |
| Capacitor **60** | 100 mmfd. |
| Capacitor **77** | 0.25 mfd. |
| Capacitor **78** | 0.25 mfd. |
| Capacitor **81** | 100 mmfd. |
| Capacitor **84** | 100 mmfd. |
| Capacitor **88** | 100 mmfd. |

What is claimed is:

1. In a diversity receiving system for frequency shift keyed telegraph signals, two receivers arranged in space diversity relation with respect to a remote transmitter, means for converting the output of one of said receivers to a frequency shift keyed signal having a first center frequency, means for converting the output of the other of said receivers to a frequency shift keyed signal having a second center frequency different from said first center frequency, means for applying both of said converted frequency shift keyed signals simultaneously to a common limiting system, thereby to increase the amplitude differential between said two converted signals, means coupled to the output of said limiting system for detecting the frequency shift keyed telegraph signals contained in such output, and a load circuit coupled to the output of said detecting means, said load circuit operating to enable utilization as intelligence of said detected frequency shift keyed telegraph signals.

2. In a diversity receiving system for frequency shift keyed tone telegraph signals, two receivers arranged in space diversity relation with respect to a remote transmitter, means for converting the output of one of said receivers to a frequency shift keyed audio tone signal having a first center frequency which is different from that of the tone at the transmitter, means for converting the output of the other of said receivers to a frequency shift keyed audio tone signal having a second center frequency which is different from said first center frequency and which is different from that of the tone at the transmitter, means for applying both of said converted frequency shift keyed tone signals simultaneously to a common limiting system, thereby to increase the amplitude differential between said two converted audio tone signals, means coupled to the output of said limiting system for detecting the frequency shift keyed telegraph signals contained in such output, and a load circuit coupled to the output of said detecting means, said load circuit operating to enable utilization as intelligence of said detected frequency shift keyed telegraph signals.

3. In a diversity receiving system for frequency shift keyed tone telegraph signals, two receivers arranged in space diversity relation with respect to a remote transmitter, means for converting the output of one of said receivers to a frequency shift keyed audio tone signal having a first center frequency which is different from that of the tone at the transmitter, means for converting the output of the other of said receivers to a frequency shift keyed audio tone signal having a second center frequency which is different from said first center frequency and which is different from that of the tone at the transmitter, means for applying both of said converted frequency shift keyed tone signals simultaneously to a common limiting system, thereby to increase the amplitude differential between said two converted audio tone signals, a first discriminator-detector receptive of one of said converted frequency shift keyed audio tone signals in the limiting system output for converting the same to a keyed D.C. signal, a second discriminator-detector receptive of the other of said converted frequency shift keyed audio tone signals in the limiting system output for converting the same to a keyed D.C. signal, and a low pass filter receptive of the outputs of said discriminator-detectors.

4. In a diversity receiving system for frequency shift keyed telegraph signals, two receivers arranged in space diversity relation with respect to a remote transmitter, means for converting the output of one of said receivers to a frequency shift keyed signal having a first center frequency, means for converting the output of the other of said receivers to a frequency shift keyed signal having a second center frequency different from said first center frequency, means for applying both of said converted frequency shift keyed signals simultaneously to a common limiting system, thereby to increase the amplitude differential between said two converted signals, a first discriminator-detector receptive of one of said converted frequency shift keyed signals in the limiting system output for converting the same to a keyed D.C. signal. A second discriminator-detector receptive of the other of said converted frequency shift keyed signals in the limiting system output for converting the same to a keyed D.C. signal, a common diode load for the diodes of both of said detectors, and means for utilizing the voltage across said common load as telegraphic intelligence.

5. In a diversity receiving system for frequency shift keyed tone telegraph signals, two receivers arranged in space diversity relation with respect to a remote transmitter, means for converting the output of one of said receivers to a frequency shift keyed audio tone signal having a first center frequency which is different from that of the tone at the transmitter, means for converting the output of the other of said receivers to a frequency shift keyed audio tone signal having a second center frequency which is different from said first center frequency and which is different from that of the tone at the transmitter, means for applying both of said converted frequency shift keyed tone signals simultaneously to a common limiting system, thereby to increase the amplitude differential between said two converted audio tone signals, a first discriminator-detector receptive of one of said converted frequency shift keyed audio tone signals in the limiting system output for converting the same to a keyed D.C. signal, a second discriminator-detector receptive of the other of said converted frequency shift keyed audio tone signals in the limiting system output for converting the same to a keyed D.C. signal, and means for utilizing the outputs of said discriminator-detectors as telegraphic intelligence.

6. In a diversity receiving system for frequency shift keyed tone telegraph signals, two receivers arranged in space diversity relation with respect to a remote transmitter, means for converting the output of one of said receivers to a frequency shift keyed audio tone signal having a first center frequency which is different from that of the tone at the transmitter, means for converting the output of the other of said receivers to a frequency shift keyed audio tone signal having a second center frequency which is different from said first center frequency and which is different from that of the tone at the transmitter, means for applying both of said converted frequency shift keyed tone signals simultaneously to a common limiting system, thereby to increase the amplitude differential between said two converted audio tone signals, a first discriminator-detector receptive of one of said converted frequency shift keyed audio tone signals in the limiting system output for converting the same to a keyed D.C. signal, a second discriminator-detector receptive of the other of said converted frequency shift keyed audio tone signals in the limiting system output for converting the same to a keyed D.C. signal, a common diode load for the diodes of both of said detectors, and a low pass filter connected across said common load.

References Cited in the file of this patent

UNITED STATES PATENTS

| | | |
|---|---|---|
| 1,961,357 | Heising | June 5, 1934 |
| 2,388,052 | Hansell | Oct. 30, 1945 |
| 2,420,868 | Crosby | May 20, 1947 |
| 2,441,661 | Crosby | May 18, 1948 |
| 2,604,586 | Kahn | July 22, 1952 |

FOREIGN PATENTS

| | | |
|---|---|---|
| 138,218 | Australia | Aug. 7, 1950 |